United States Patent
Zou et al.

(10) Patent No.: US 12,243,044 B2
(45) Date of Patent: Mar. 4, 2025

(54) METHOD, TERMINAL DEVICE, SERVER, SYSTEM AND STORAGE MEDIUM FOR ACTIVATING PAYMENT FUNCTIONS

(71) Applicant: CHINA UNIONPAY CO., LTD., Shanghai (CN)

(72) Inventors: Zhenzhong Zou, Shanghai (CN); Cheng Peng, Shanghai (CN); Quan Sun, Shanghai (CN); Gang Liu, Shanghai (CN); Ruiming Wang, Shanghai (CN); Yanping Wu, Shanghai (CN); Chengchu Zhan, Shanghai (CN); Hua Cai, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 11 days.

(21) Appl. No.: 17/921,400

(22) PCT Filed: Sep. 10, 2021

(86) PCT No.: PCT/CN2021/117637
§ 371 (c)(1),
(2) Date: Oct. 26, 2022

(87) PCT Pub. No.: WO2022/134660
PCT Pub. Date: Jun. 30, 2022

(65) Prior Publication Data
US 2023/0196337 A1    Jun. 22, 2023

(30) Foreign Application Priority Data
Dec. 23, 2020    (CN) .......................... 202011535702.1

(51) Int. Cl.
G06Q 20/40    (2012.01)
G06Q 20/32    (2012.01)
G06Q 20/34    (2012.01)

(52) U.S. Cl.
CPC ....... *G06Q 20/354* (2013.01); *G06Q 20/3276* (2013.01); *G06Q 20/3278* (2013.01); *G06Q 20/4014* (2013.01)

(58) Field of Classification Search
CPC ............. G06Q 20/354; G06Q 20/3276; G06Q 20/3278; G06Q 20/4014; G06Q 20/3263;
(Continued)

(56) References Cited

U.S. PATENT DOCUMENTS 8,646,059 B1    2/2014    von Behren et al.
9,830,588 B2    11/2017    Davis et al.
(Continued)

FOREIGN PATENT DOCUMENTS

CN    105590214 A    5/2016
CN    106170809 A    11/2016
(Continued)

OTHER PUBLICATIONS

Chong Hing Bank: Chong Hing Credit Card Payment Function Enhancement, Jan. 19, 2019, p. 1 (Year: 2019).*
(Continued)

*Primary Examiner* — Bijendra K Shrestha
(74) *Attorney, Agent, or Firm* — K&L Gates LLP

(57) ABSTRACT

The present application provides a method, terminal device, server, system and storage medium for activating payment functions. The method is applicable to a terminal device. The method includes receiving a first input from a user; generating a payment function activation request in response to the first input, the payment function activation request including a payment function identifier for indicating various payment functions that are instructed to be activated for a target resource card; sending, to a server, the payment function activation request; and receiving an activation reply message sent by the server, the activation reply message
(Continued)

comprising a target payment identifier generated by the server according to the payment function identifier, the target payment identifier including payment identifiers of the target resource card under the various payment functions that are instructed to be activated for the target resource card.

13 Claims, 9 Drawing Sheets

(58) Field of Classification Search
CPC ... G06Q 20/341; G06Q 20/3572; G06Q 20/40
See application file for complete search history.

(56) References Cited

U.S. PATENT DOCUMENTS

| | | | |
|---|---|---|---|
| 10,134,087 B1 * | 11/2018 | Geller | G06Q 40/00 |
| 10,748,137 B2 * | 8/2020 | Zhang | G06F 3/04817 |
| 2012/0172026 A1 * | 7/2012 | Kwon | H04W 12/068 455/419 |
| 2012/0174189 A1 * | 7/2012 | Lim | G06F 21/88 726/26 |
| 2014/0222670 A1 | 8/2014 | Concannon | |
| 2014/0279479 A1 | 9/2014 | Maniar et al. | |
| 2015/0339661 A1 | 11/2015 | Li et al. | |
| 2016/0063486 A1 | 3/2016 | Purves et al. | |
| 2016/0300211 A1 * | 10/2016 | Brown | G06Q 20/3278 |
| 2017/0372297 A1 | 12/2017 | Zhang et al. | |
| 2018/0129923 A1 | 5/2018 | Olson et al. | |
| 2019/0005491 A1 | 1/2019 | Grassadonia et al. | |
| 2023/0351384 A1 * | 11/2023 | Liu | G06Q 20/355 |

FOREIGN PATENT DOCUMENTS

| | | | |
|---|---|---|---|
| CN | 104751330 B | 1/2018 | |
| CN | 109615366 A | 4/2019 | |
| CN | 109842605 A | 6/2019 | |
| CN | 110288332 A | 9/2019 | |
| CN | 111192035 A | 5/2020 | |
| CN | 109842605 B | 7/2020 | |
| CN | 106170809 B | 9/2020 | |
| CN | 112288425 A | 1/2021 | |
| EP | 3564886 A1 | 5/2017 | |
| EP | 3232391 A1 * | 10/2017 | G06Q 20/204 |
| EP | 3261040 A1 | 12/2017 | |
| EP | 3693911 A1 | 11/2018 | |
| IN | 110969437 A | 4/2020 | |
| JP | 2018519567 A | 7/2018 | |
| JP | 2019145071 A | 8/2019 | |
| JP | 2020057433 A | 4/2020 | |
| JP | 2020087168 A1 | 6/2020 | |
| KR | 20160105297 A | 9/2016 | |
| TW | 202016850 A | 5/2020 | |
| WO | WO-2009158420 A1 * | 12/2009 | G06Q 20/02 |
| WO | WO-2012091349 A2 * | 7/2012 | G06F 21/34 |
| WO | WO-2012091351 A2 * | 7/2012 | G06F 21/34 |
| WO | 2018149048 A1 | 8/2018 | |
| WO | WO2020103563 A1 | 5/2020 | |

OTHER PUBLICATIONS

Visa: Visa Payment Processing, 2015, pp. 1-5 (Year: 2015).*
Chong Hing Bank: Chong Hing Credit Card Payment Function Enforcement. Jan. 15, 2019, p. 1 (Year: 2019).*
Fonte, Erin F.: Mobile Payments in United States: How Disintermediation May Affect Delivery of Payment Functions, Financial Inclusion and Ant-Money Laundering, Jan. 1, 2013, Washington Journal of Law, Technology & Arts, vol. 8, Issue 3 Mobile Money Symposium, Article 13, pp. 1-39. (Year: 2013).*
CNIPA; Office Action for Hong Kong Patent Application No. 22021038995.7 dated Apr. 14, 2023, 10 pages.
CNIPA; Office Action for Taiwanese Patent Application No. 110143404 dated Jan. 4, 2023, 13 pages.
JPO; Notice for Reasons of Refusal for Japanese Patent Application No. 2022-564275 dated Nov. 20, 2023, 11 pages.
First Office Action dated Feb. 7, 2021 issued for Chinese Patent Application No. 202011535702.1.
Second Office Action dated Feb. 24, 2021 issued for Chinese Patent Application No. 202011535702.1.
International Search Report dated Oct. 26, 2021 issued for International PCT Application No. PCT/CN2021/117637.
The Extended European Search Report dated Sep. 5, 2023 issued for European Patent Application No. 21908110.6.
Japanese Patent Office Action dated May 7, 2024, issued for Japanese Patent Application 2022-564275.
KIPO; Request for the Submission of an Opinion for Korean Patent Application No. 10-2022-7036792 dated Jan. 6, 2025, 21 pages.

* cited by examiner

METHOD, TERMINAL DEVICE, SERVER, SYSTEM AND STORAGE MEDIUM FOR ACTIVATING PAYMENT FUNCTIONS

CROSS-REFERENCE TO RELATED APPLICATIONS

The present application is a National Stage of International Application No. PCT/CN2021/117637, filed on Sep. 10, 2021, which claims the priority to Chinese patent application No. 202011535702.1, entitled "METHOD, TERMINAL DEVICE, SERVER, SYSTEM AND STORAGE MEDIUM FOR ACTIVATING PAYMENT FUNCTIONS" and filed on Dec. 23, 2020, both of which are incorporated herein by reference in their entireties.

TECHNICAL FIELD

The present application relates to the field of data processing, and particularly to a method, terminal device, server, system and storage medium for activating payment functions.

BACKGROUND

With the development of information technology, mobile payment has become a mainstream payment approach, which is a way centered on a user's terminal device and to settle and pay for purchased products or services through the terminal device.

In addition an ordinary order payment function, the mobile payment can include a variety of payment functions implemented in different ways. However, it is required to activate the payment functions implemented in different ways one by one for the terminal device, before the terminal device can use the corresponding payment functions to pay. As such, user operations are relatively complicated.

SUMMARY

Embodiments of the present application provide a method, terminal device, server, system and storage medium for activating payment functions, which can reduce user's operations for activating payment functions.

In a first aspect, an embodiment of the present application provides a method for activating payment functions. The method is applicable to a terminal device. The method includes receiving a first input from a user; generating a payment function activation request in response to the first input, the payment function activation request including a payment function identifier for indicating various payment functions that are instructed to be activated for a target resource card, the various payment functions that are instructed to be activated for the target resource card including payment functions that are supported by the terminal device and to activate for the target resource card but have not been activated for the target resource card; sending, to a server, the payment function activation request for instructing the server to activate the various payment functions indicated by the payment function identifier; and receiving an activation reply message sent by the server, the activation reply message including a target payment identifier generated by the server according to the payment function identifier, the target payment identifier including payment identifiers of the target resource card under the various payment functions that are instructed to be activated for the target resource card, and each payment identifier being an identifier required for payment using a corresponding payment function.

In a second aspect, an embodiment of the present application provides a method for activating payment functions. The method is applicable to a server. The method includes receiving a payment function activation request sent by a terminal device, the payment function activation request including a payment function identifier for indicating various payment functions that are instructed to be activated for a target resource card, the various payment functions that are instructed to be activated for the target resource card including payment functions that are supported by the terminal device to activate for the target resource card but have not been activated for the target resource card; generating a target payment identifier corresponding to the various payment functions indicated by the payment function identifier, according to the payment function activation request, the target payment identifier including payment identifiers of the target resource card under the various payment functions that are instructed to be activated for the target resource card, and each payment identifier being an identifier required for payment using a corresponding payment function; generating, based on the target payment identifier, an activation reply message including the target payment identifier; and sending the activation reply message to the terminal device.

In a third aspect, an embodiment of the present application provides a terminal device. The terminal device includes an input module, configured to receive a first input from a user; a generating module, configured to generate a payment function activation request in response to the first input, the payment function activation request including a payment function identifier for indicating various payment functions that are instructed to be activated for a target resource card, the various payment functions that are instructed to be activated for the target resource card including payment functions that are supported by the terminal device to activate for the target resource card but have not been activated for the target resource card; a sending module, configured to send, to a server, the payment function activation request for instructing the server to activate the various payment functions indicated by the payment function identifier; and a receiving module, configured to receive an activation reply message sent by the server, the activation reply message including a target payment identifier generated by the server according to the payment function identifier, the target payment identifier including payment identifiers of the target resource card under the various payment functions that are instructed to be activated for the target resource card.

In a fourth aspect, an embodiment of the present application provides a server. The server includes a receiving module, configured to receive a payment function activation request sent by a terminal device, the payment function activation request including a payment function identifier for indicating various payment functions that are instructed to be activated for a target resource card, the various payment functions that are instructed to be activated for the target resource card including payment functions that are supported by the terminal device to activate for the target resource card but have not been activated for the target resource card; a first generating module, configured to generate a target payment identifier corresponding to various payment functions indicated by the payment function identifier, according to the payment function activation request, the target payment identifier including payment identifiers of the target resource card under the various payment functions that are instructed to be activated for the target resource card, and each payment identifier being an identifier required for payment using a corresponding payment functions; a second generating module, configured to generate, based on the target payment identifier, an activation reply message including the target payment identifiers; and a sending module, configured to send the activation reply message to the terminal device.

In a fifth aspect, an embodiment of the present application provides a terminal device. The terminal device includes a processor and a memory having computer program instructions stored thereon. The computer program instructions, when executed by the processor, cause the method for activating payment functions in the first aspect to be implemented In a sixth aspect, an embodiment of the present application provides a server. The server includes a processor and a memory having computer program instructions stored thereon. The computer program instructions, when executed by the processor, cause the method for activating payment functions in the second aspect to be implemented In a seventh aspect, an embodiment of the present application provides a system for activating payment functions, including the terminal device of the fifth aspect and the server of the sixth aspect.

In an eighth aspect, an embodiment of the present application provides a computer-readable storage medium having computer program instructions stored thereon. The computer program instructions, when executed by a processor, cause the method for activating payment functions in the first aspect and the method for activating payment functions in the second aspect to be implemented.

The embodiments of the present application provide the method, terminal device, server, system and storage medium for activating payment functions. The terminal device generates, in response to the first input from the user, the payment function activation request including the payment function identifier(s) for indicating the various payment functions that are instructed to be activated for the target resource card, and sends the payment function activation request to the server, so that the server activates the payment functions according to the payment function identifier(s) in the payment function activation request and sends the target payment identifier(s) corresponding to the various activated payment functions to the terminal device through the activation reply message. The terminal device receives the activation reply message, and can use the target payment identifier(s) corresponding to the activated payment functions to pay in a subsequent process. The server can activate, according to the payment function identifier(s), the various payment functions that are supported to be activated for the target resource card at one time, and there is thus no need to activate the various payment functions one by one.

BRIEF DESCRIPTION OF THE DRAWINGS

In order to illustrate technical solutions of embodiments of the present application more clearly, drawings required for embodiments of the present application will be introduced briefly below. Those of ordinary skills in the art may obtain other drawings according to these drawings without any creative work.

DETAILED DESCRIPTION

Features of various aspects and exemplary embodiments of the present application will be described in details below. In order to make objects, technical solutions and advantages of the present application clearer, the present application is further described in details below with reference to the drawings and specific embodiments. It should be understood that, the specific embodiments described herein are merely intended to explain the present application, not to limit the present application. For those skilled in the art, the present application may be implemented without some of these specific details. The following description of the embodiments is only for providing a better understanding of the present application by illustrating examples of the present application.

With the development of information technology, mobile payment has become a mainstream payment approach. Mobile payment can include a variety of payment functions implemented in different ways. Different payment functions should be activated one by one by a user, and a payment function can be used for payment only after the payment function has been activated.

The present application provides a method, terminal device, server, system and storage medium for activating payment functions, which can activate various payment functions that can be supported by the terminal device at one time, and thereby simplify a process for activating payment functions.

Figure 1:
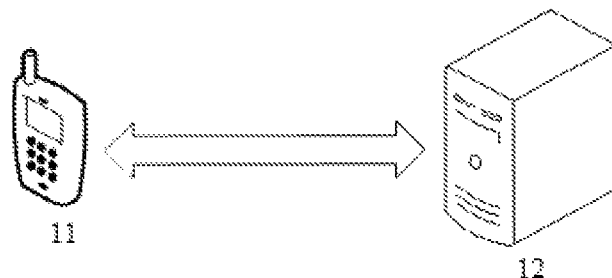
FIG. 1 is an architecture diagram of an example of a system for activating payment functions provided by an embodiment of the present application.

FIG. 1 is an architecture diagram of an example of a system for activating payment functions provided by an embodiment of the present application. As shown in FIG. 1, the system for activating payment functions can include a terminal device 11 and a server 12. The terminal device 11 is a device that a user can use for mobile payment, which can specifically include, but not be limited to, a mobile phone, a tablet computer, a wearable device, and the like. The server 12 can include a management server and a background server corresponding to a payment application in the terminal device, the server 12 can be a server that integrates functions of the management server and functions of the background server corresponding to the payment application in the terminal device, or alternatively, the server 12 can be the management server, which is not limited herein. The management server can be configured to generate and manage payment identifiers. In an embodiment of the present application, payment functions can be activated through interactions between the terminal device 11 and the server 12.

Figure 2:
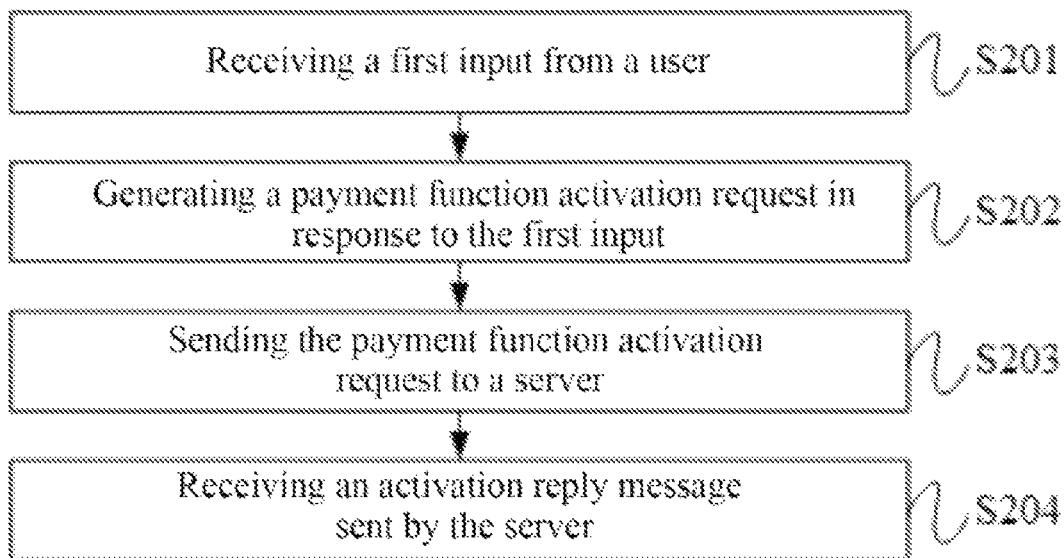
FIG. 2 is a flowchart of an embodiment of the method for activating payment functions provided by the first aspect of the present application.

The first aspect of the present application provides the method for activating payment functions, and the method for activating payment functions is applicable to the terminal device. FIG. 2 is a flowchart of an embodiment of the method for activating payment functions provided by the first aspect of the present application. As shown in FIG. 2, the method for activating payment functions can include steps S201-S203.

In step S201, a first input from a user is received.

The first input from the user is used to instruct to activate various payment functions specified for a target resource card. The target resource card is a resource card for which the payment functions are to be activated, and the resource card here can include a bank card, a loyalty card, etc., which can be embodied in a form of a resource card account or a virtual resource card, which is not limited herein. In some examples, the first input can be used to instruct to activate the various functions specified for the target resource card. Particularly, the payment functions may be mobile payment functions of the resource card. In some examples, the payment functions can include but not be limited to a near field communication (NFC) payment function, a quick response (QR) code payment function, and the like. For example, under a condition that the near field communication payment function and QR code payment function of the target resource card can be activated, the first input can be used to instruct to activate the near field communication payment function and the QR code payment function for the target resource card.

In some examples, the terminal device can display a function activation interface, and the function activation interface can include a function activation area. The function activation area is used to receive the first input to trigger the activation of the various payment functions that can be activated for the target resource card. The function activation area can be embodied in the form of a button, slider and the like, which is not limited herein.

In step S202, a payment function activation request is generated in response to the first input.

The payment function activation request includes payment function identifier(s). The payment function identifier(s) can be used to indicate the various payment functions that are instructed to be activated for the target resource card. That is, the payment function identifier(s) can be used to indicate the various payment functions that are instructed to be activated for the target resource card. The various payment functions that are instructed to be activated for the target resource card can be determined according to a device model of the terminal device, activated payment functions, or can be determined according to the device model of the terminal device, the activated payment functions and user's choices. The device model can represent hardware information of the terminal device. The hardware information can indicate hardware components included in the terminal device. The payment functions of the target resource card can include payment functions that can be supported by the terminal device to activate, and the payment functions that can be supported by the terminal device to activate can include the payment functions that are instructed to be activated for the target resource card. For example, the payment functions of the target resource card can include the near field communication payment function and the QR code payment function, and correspondingly, the payment functions that can be supported by the terminal device to activate can include the near field communication payment function and the QR code payment function, and the payment functions that are instructed to be activated for the target resource card can include the near field communication payment function and the QR code payment function, or the payment function that are instructed to be activated for the target resource card can include the QR code payment function. As another example, the payment functions of the target resource card include the near field communication payment function and the QR code payment function, and correspondingly, the payment functions that can be supported by the terminal device to activate can include the QR code payment function, and the payment function that are instructed to be activated for the target resource card can include the QR code payment function.

Specifically, hardware information of the terminal device and payment function activation status of the target resource card are obtained in response to the first input. Various payment functions that are by the terminal device to activate for the target resource card can be determined according to the hardware information of the terminal device and the payment function activation status of the target resource card. The various payment functions that are instructed to be activated for the target resource card can be determined based on the various payment functions that are supported by the terminal device to activate for the target resource card. The payment function identifier(s) can be generated according to the various payment functions that are instructed to be activated for the target resource card. The payment function activation request can be generated according to the payment function identifier(s).

The terminal device may or may not support a payment function that can be activated for the target resource card. Not all of the various payment functions that are supported by the terminal device are to be instructed to be activated for the target resource card. In an embodiment of the present application, the payment functions that are supported by the terminal device can be determined according to the hardware information of the terminal device. At least some of the payment functions that can be activated for the target resource card may have been activated by other ways previously, and there is no need to activate the activated payment functions repeatedly. The payment function activation status of the target resource card can indicate whether each of the various payment functions is activated for the target resource card. Payment functions that have been activated for the target resource card can be determined through the payment function activation status of the target resource card. Further, payment functions that can be activated but have not been activated for the target resource card can be determined according to the activated payment functions for the target resource card. An intersection between the payment functions that are supported by the terminal device and the payment functions that can be activated but have not been activated for the target resource card constitute the payment functions that are supported by the terminal device to activate for the target resource card. The various payment functions that are instructed to be activated for the target resource card can be determined from the payment functions that can be supported by the terminal device to activate for the target resource card.

In some examples, the terminal device can send a prompt message based on the various payment functions that are supported by the terminal device to activate for the target resource card. The prompt message can include the various payment functions that are supported by the terminal device to activate for the target resource card. A form of the prompt message is not limited herein. For example, the prompt message can be displayed on the terminal device. The terminal device can receive a select input from the user. The select input can be used to instruct the various payment functions included in the prompt information. The various payment functions instructed by the select input can be determined as the various payment functions that are specified to be activated for the target resource card. The various payment functions that are specified to be activated for the target resource card can be activated, based on the payment function identifier(s) generated according to the various payment functions that are specified to be activated for the target resource card as determined by the select input.

The method for activating payment functions in the embodiments of the present application can be applied to any terminal device. In some examples, the terminal device can determine the payment functions that are supported by the terminal device to activate for the target resource card, through its own hardware information and the activated payment functions of the target resource card, and determine the payment functions that are supported by the terminal device to activate for the target resource card as payment functions to be activated. In some other examples, the terminal device can select at least a part of the payment functions that are supported by the terminal device to activate for the target resource card to be the payment functions to be activated, through its own hardware information, the activated payment functions of the target resource card and the select input from the user. As such, good compatibility can be achieved, and it is more flexible to select the payment functions to be activated.

In some examples, regardless of the number of the payment functions that are supported to be activated for the target resource card is one or more, the number of the generated payment function identifier is one. That is, under a condition that the number of the payment functions that are supported to be activated for the target resource card is more than one, the more than one payment functions can reuse the one payment function identifier.

In other examples, each payment function identifier can correspond to one payment function. That is, under a condition that the number of the payment functions that are supported to be activated for the target resource card is more than one, the terminal device can generate corresponding more than one payment function identifiers. The more than one payment function identifiers can be carried in one payment function activation request.

Different payment functions that are instructed to be activated for the target resource card may correspond to different payment function identifiers.

For example, a specific field in the payment function activation request can carry the payment function identifier(s). Under a condition that the payment functions that are instructed to be activated for the target resource card include a payment function A and a payment function B, the payment function identifier may be 00; under a condition that the payment functions that are instructed to be activated for the target resource card include the payment function A, the payment function identifier may be 01; under a condition that the payment functions that are instructed to be activated for the target resource card include the payment function B, the payment function identifier may be 10; under a condition that the payment functions that are instructed to be activated for the target resource card include the payment function B and a payment function C, the payment function identifier may bell.

As another example, the specific field in the payment function activation request can carry a plurality of payment function identifiers. Under a condition that the payment functions that are instructed to be activated for the target resource card include the payment function A and the payment function B, the payment function identifiers may include 01 and 10.

In some other examples, the first input can be used to instruct to call a payment function of the target resource card. The terminal device can call a payment function of the target resource card in response to the first input. Under a condition that it is determined that the payment function has not been activated for the target resource card and the calling fails, the payment function activation request can be generated to activate the various payment functions that are instructed to be activated for the target resource card. Under a condition that the payment function of the target resource card is called successfully, the payment can be performed according to the target resource card.

The first input can be a preset input operation performed by the user on a preset component of the terminal device. The preset component can be one or more than one components of the terminal device. That is, the terminal device can be aroused directly by a predetermined hardware operation on the component(s) of the terminal device, to call the payment function(s) of the target resource card for payment. The preset component(s) and preset input operation(s) can be set according to a particular situation, which is not limited herein. For example, the preset component(s) can include but not be limited to one or more of a power button, volume button(s), a home button, biometric feature (such as, a fingerprint, a face, etc.) input component(s) and the like of the terminal device. The preset input operation(s) can include operations such as double-clicking, or clicking two buttons at the same time, or the like. Further, the terminal device can be aroused to call the payment function(s) of the target resource card in response to the first input, even when the terminal device is sleeping, its screen is turned off or locked.

In step S203, the payment function activation request is sent to a server.

The payment function activation request is sent to the server, so that the server can activate the various payment functions indicated by the payment function identifier(s) according to the payment function identifier(s) in the payment function activation request, and can generate target payment identifier(s) corresponding to the various payment functions indicated by the payment function identifier(s), and the target payment identifier(s) can be sent to the terminal device through an activation reply message.

In step S204, the activation reply message sent by the server is received.

The activation reply message can include the target payment identifier(s) generated by the server according to the payment function identifier(s). It means that the various payment functions indicated by the payment function identifier(s) in the payment function activation request are activated successfully, when the activation reply message includes the target payment identifier(s). The target payment identifier(s) may include payment identifier(s) (i.e., payment Token(s)) of the target resource card under the various payment functions that are instructed to be activated for the target resource card. That is, the target payment identifier(s) may include the payment identifier(s) of the target resource card under the various payment functions that are instructed to be activated for the target resource card. A format and content of a target payment identifier can be associated with a card number of the resource card and a payment function, and should conform to a payment identifier specification, which is not limited herein.

Each target payment identifier can correspond to one of the payment functions that are instructed to be activated for the target resource card. For example, the payment functions that are instructed to be activated for the target resource card include the payment function A and the payment function B, the target payment identifiers may include a payment identifier C1 and a payment identifier C2, the payment identifier C1 is a payment identifier required for payment using the payment function A of the target resource card, and the identifier C2 is a payment identifier required for payment using the payment function B of the target resource card.

The terminal device can store the target payment identifier(s), so as to use the target payment identifier(s) for payment when a certain payment function of the target resource card is used. Specifically, under a condition that the terminal device includes a secure element (Secure Element, SE) and/or a trusted execution environment (Trusted Execution Environment, TEE), the target payment identifier(s) can be stored in the secure element and/or stored in the trusted execution environment, to ensure security of the target payment identifier(s).

In the embodiment of the present application, the terminal device generates, in response to the first input from the user, the payment function activation request including the payment function identifier(s) for indicating the various payment functions that are instructed to be activated for the target resource card, and sends the payment function activation request to the server, so that the server activates the payment functions according to the payment function identifier(s) in the payment function activation request and sends the target payment identifier(s) corresponding to the various activated payment functions to the terminal device through the activation reply message. The terminal device receives the activation reply message, and can use the target payment identifier(s) corresponding to the activated payment functions to pay in a subsequent process. The server can activate, according to the payment function identifier(s), the various payment functions that are supported to be activated for the target resource card at one time, and there is thus no need to activate the various payment functions one by one. Therefore, user operations for activating the payment functions can be reduced, and the process for activating the payment functions can also be simplified.

The various payment functions that are instructed to be activated for the target resource card can be activated at one time, and the payment identifier(s) corresponding to the various activated payment functions can be sent to the terminal device, so that the terminal device can use corresponding payment identifier(s) for payment under different payment functions.

An example in which the various payment functions of the target resource card include the near field communication payment function and the QR code payment function is illustrated below for description.

In some examples, under a condition that the hardware information indicates that the terminal device includes a near field communication module and the near field communication payment function and the QR code payment function have not been activated for the target resource card, the payment function identifier(s) may indicate the near field communication payment function and the QR code payment function, and the target payment identifier(s) may include a payment identifier of the target resource card under the near field communication payment function and a payment identifier of the target resource card under the QR code payment function.

The near field communication module may be a hardware component that can support the near field communication function. It means that the terminal device can support the near field communication payment function, when the terminal device includes the near field communication module. Under a condition that the near field communication payment function and the QR code payment function have not been activated for the terminal device, the terminal device can generate the payment function identifier(s) indicating the near field communication payment function and the QR code payment function, and send the payment function identifier(s) indicating the near field communication payment function and the QR code payment function to the server through the payment function activation request, so that the near field communication payment function and the QR code payment function can be activated at one time. The server can determine that the terminal device requests to activate the near field communication payment function and the QR code payment function according to the payment function identifier(s) in the payment function activation request. The server can generate the payment identifier of the target resource card under the near field communication payment function and the payment identifier of the target resource card under the QR code payment function, and send the two payment identifiers to the terminal device through the activation reply message.

In some other examples, under a condition that the hardware information indicates that the terminal device includes the near field communication module, and the near field communication payment function has been activated for the target resource card and the QR code payment function has not been activated for the target resource card, the payment function identifier may indicate the QR code payment function, and the target payment identifier may include the payment identifier of the target resource card under the QR code payment function.

It means that the terminal device can support the near field communication payment function, when the terminal device includes the near field communication module. Under a condition that the near field communication payment function has been activated but the QR code payment function has not been activated for the target resource card, there is no need to activate the near field communication payment function repeatedly. The terminal device can generate the payment function identifier indicating the QR code payment function, and send the payment function identifier indicating the QR code payment function to the server through the payment function activation request, so that the QR code payment function can be activated. The server can determine that the terminal device requests to activate the QR code payment function according to the payment function identifier in the payment function activation request. The server can generate the payment identifier of the target resource card under the QR code payment function, and send the payment identifier to the terminal device through the activation reply message.

In some yet other examples, under a condition that the hardware information indicates that the terminal device includes the near field communication module, and the QR payment function has been activated for the target resource card but the near field communication payment function has not been activated for the target resource card, the payment function identifier may indicate the near field communication payment function, and the target payment identifier may include the payment identifier of the target resource card under the near field communication payment function.

It means that the terminal device can support the near field communication payment function, when the terminal device includes the near field communication module. Under a condition that the QR payment function has been activated for the target resource card but the near field communication payment function has not been activated for the target resource card, there is no need to activate the QR payment function repeatedly. The terminal device can generate the payment function identifier indicating the near field communication payment function, and send the payment function identifier indicating the near field communication payment function to the server through the payment function activation request, so that the near field communication payment function can be activated. The server can determine that the terminal device requests to activate the near field communication payment function according to the payment function identifier in the payment function activation request. The server can generate the payment identifier of the target resource card under the near field communication payment function, and send the payment identifier to the terminal device through the activation reply message.

In some yet other examples, under a condition that the hardware information indicates that the terminal device does not include the near field communication module, and the QR code payment function has not been activated for the target resource card, the payment function identifier may indicate the QR code payment function, and the target payment identifier may include the payment identifier of the target resource card under the QR code payment function.

It means that the terminal device cannot support the near field communication payment function, when the terminal device does not include the near field communication module. Even when both the near field communication payment function and the QR code payment function have not been activated for the target resource card, the payment function identifier generated by the terminal device will not indicate the near field communication payment function. The terminal device can generate the payment function identifier indicating the QR code payment function, and send the payment function identifier indicating the QR code payment function to the server through the payment function activation request, so that the QR code payment function can be activated. The server can determine that the terminal device requests to activate the QR code payment function according to the payment function identifier in the payment function activation request. The server can generate the payment identifier of the target resource card under the QR code payment function, and send the payment identifier to the terminal device through the activation reply message.

Figure 3:
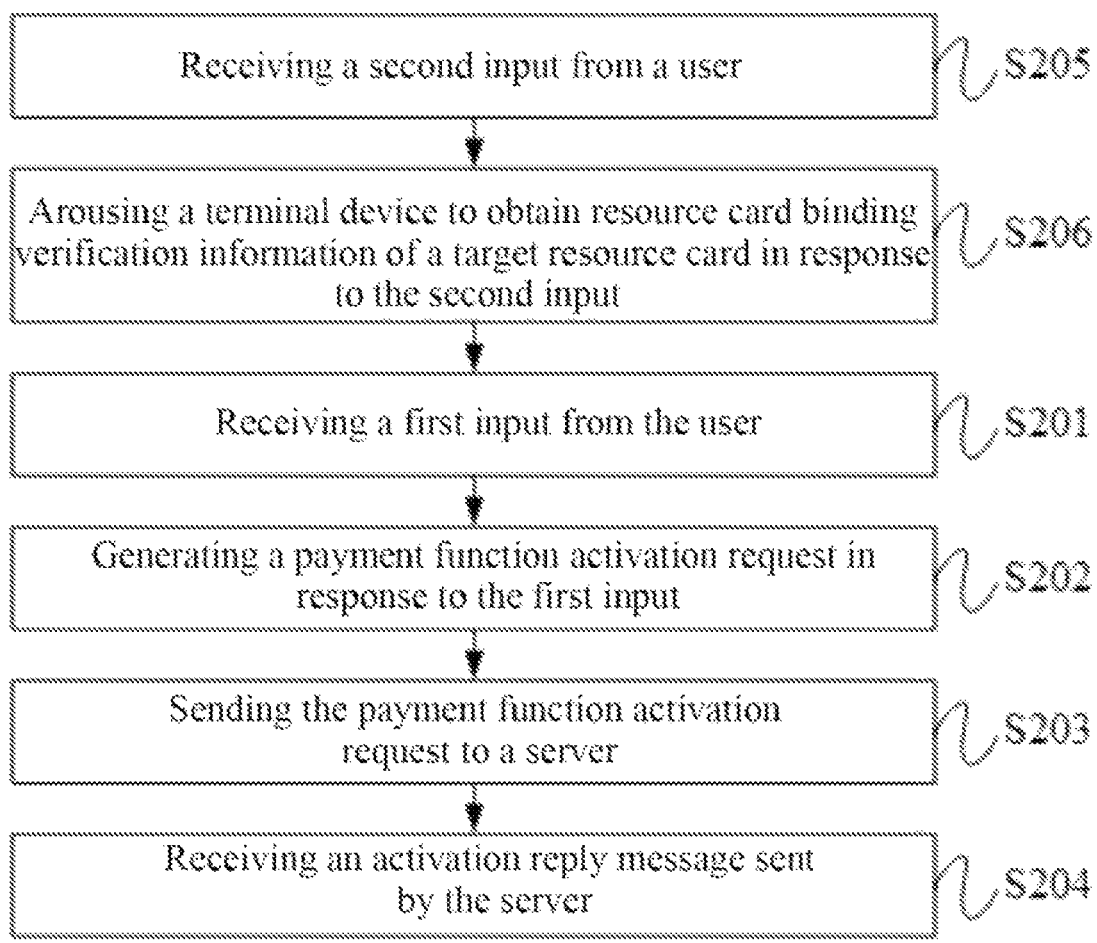
FIG. 3 is a flowchart of another embodiment of the method for activating payment functions provided by the first aspect of the present application.

Further, in some examples, binding a resource card and activating payment function(s) for the resource card can be completed at one time. FIG. 3 is a flowchart of another embodiment of the method for activating payment functions provided by the first aspect of the present application. FIG. 3 is different from FIG. 2 in that the method for activating payment functions shown in FIG. 3 can further include steps S205 and S206.

In step S205, a second input from the user is received.

In step S206, the terminal device is aroused to obtain resource card binding verification information of the target resource card in response to the second input.

The resource card binding verification information is used to verify a binding of the target resource card to a user's account, that is, the resource card binding verification information is card information required by the resource card binding verification, which can be set according to scenarios and requirements, and is not limited herein. For example, the resource card binding verification information can include one or more of a card number of the resource card, a user's phone number, a password of the resource card, a card verification value (CVV), etc., which is not limited herein.

In some examples, specifically, the terminal device can be aroused to display an information collection interface in response to the second input, and the information collection interface can prompt the user to input the resource card binding verification information. The terminal device can receive the resource card binding verification information entered by the user, that is, obtain the resource card binding verification information.

In some other examples, specifically, in response to the second input, the terminal device can be aroused to read the resource card binding verification information stored in the terminal device, that is, to obtain the resource card binding verification information.

The payment function activation request can further include the resource card binding verification information. The payment function activation request can be generated according to both the resource card binding verification information and the payment function identifier(s), so that the payment function activation request can request to bind the resource card and activate payment function(s) at the same time. As such, the binding of the resource card can be combined with the activating of payment function(s), and it is not necessary to activate the payment function(s) after the resource card has been bound. Therefore, the payment function(s) can be activated at the same time as the process for binding the resource card, which reduces user operations and simplifies the process for binding the resource card and activating the payment function(s) for it.

In some examples, the second input may be a first preset input operation performed by the user on a first preset component of the terminal device. The first preset component can be one or more components of the terminal device. That is, the terminal device can be aroused directly by a predetermined hardware operation on the component(s) of the terminal device, to obtain the resource card binding verification information, so as to perform subsequent card binding and payment function activation. The first preset component and the first preset input operation can be set according to particular situation, which is not limited herein. For example, the first preset component(s) can include but not be limited to one or more of a power button, volume button(s), a home button, biometric feature (such as, a fingerprint, a face, etc.) input component(s) and the like of the terminal device. The first preset input operation(s) can include operations such as double-clicking or clicking two buttons at the same time, or the like. Further, the terminal device can be aroused to obtain the resource card binding verification information of the target resource card in response to the second input, even when the terminal device is sleeping, its screen is turned off or locked.

With the predetermined hardware operation(s) on the component(s) of the terminal device, the process of card binding and payment function activation for the terminal device can be directly aroused in one step, and it is not necessary for the user to carry out a series of operations including arousing the terminal device, unlocking the screen, entering the payment application, and clicking a corresponding function area in the payment application. Therefore, the user operations can be reduced, time required for the process of the card binding and payment function activation can be saved, and thereby the efficiency of the card binding and payment function activation can be improved.

Figure 4:
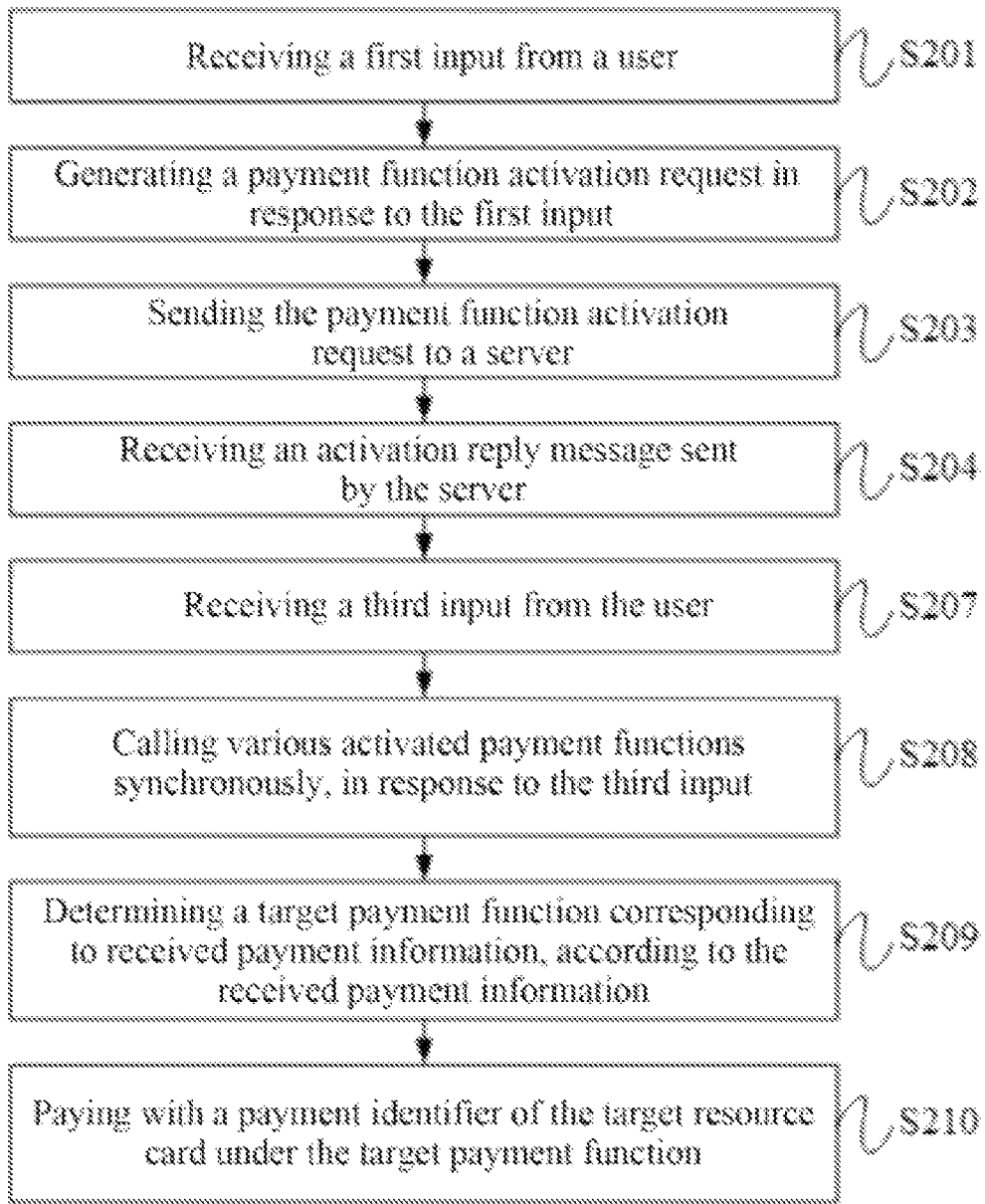
FIG. 4 is a flowchart of yet another embodiment of the method for activating payment functions provided by the first aspect of the present application.

FIG. 4 is a flowchart of yet another embodiment of the method for activating payment functions provided by the first aspect of the present application. FIG. 4 is different from FIG. 2 in that a method for activating payment functions shown in FIG. 4 can further include steps S207-S210.

In step S207, a third input from the user is received.

In step S208, various activated payment functions are called synchronously in response to the third input.

In some examples, the terminal device can be aroused to display a payment interface in response to the third input. The payment interface can include the various activated payment functions. For example, the activated payment functions of the target resource card may include the near field communication payment function and the QR code payment function, and correspondingly, the near field communication payment function and the QR code payment function can be called synchronously in response to the third input, that is, both a near field communication payment and a QR code payment can be implemented.

Calling the various activated payment functions synchronously can satisfy payment scenarios corresponding to the various payment functions. Under a condition that the payment scenarios are switched, there is no need to switch the payment functions, so that the user operations are reduced during the payment, time required for the payment can be reduced, and the efficiency of payment can be improved.

In some examples, the third input may be a second preset input operation performed by the user on a second preset component of the terminal device. The second preset component can be one or more components of the terminal device. That is, the terminal device can be aroused directly by a predetermined hardware operation on the component(s) of the terminal device, to call the various activated payment functions to pay. The second preset component and the second preset input operation can be set according to particular situation, which is not limited herein. For example, the second preset component(s) can include but not be limited to one or more of a power button, volume button(s), a home button, biometric feature (such as, a fingerprint, a face, etc.) input component(s) and the like of the terminal device. The second preset input operation(s) can include operations such as double-clicking or clicking two buttons at the same time, or the like. Further, the terminal device can be aroused to call the various activated payment functions in response to the third input, even when the terminal device is sleeping, its screen is turned off or locked.

With the predetermined hardware operation(s) on the component(s) of the terminal device, a paying process of the terminal device can be aroused directly in one step, and it is not necessary for the user to carry out a series of operations including arousing the terminal device, unlocking the screen, entering the payment application, and clicking a corresponding function area in the payment application. Therefore, the user operations can be reduced, time required for the paying process can be saved, and thereby the efficiency of payment can be improved.

In step S209, a target payment function corresponding to the received payment information is determined according to the payment information.

In step S210, a payment identifier of the target resource card under the target payment function is used for payment.

The payment information may have forms corresponding to the payment functions. According to the received payment information, the target payment function corresponding to the payment information can be determined, so that the payment identifier of the target resource card under the target payment function can be used for payment. For example, if the received payment information is received through the near field communication, the target payment function can be determined to be the near field communication payment function, and correspondingly the payment identifier of the target resource card under the near field communication payment function can be used for payment. As another example, if the received payment information is a QR code, the target payment function can be determined to be the QR code payment function, and correspondingly the payment identifier of the target resource card under the QR code payment function can be used for payment.

The method for activating payment functions in the embodiments of the present application can be applied to a scenario of activating the payment function(s) for an unbound resource card, or a scenario of activating the payment function(s) for a bound resource card. In the scenario of activating the payment function(s) for the bound resource card, there is no need to perform resource card user verification during the process of activating the payment function(s).

In some embodiments, the above steps S207-S210 can be implemented independently from the above steps S201-S204. In some examples, when the various activated payment functions are called synchronously, but a payment function has not been activated and the calling fails, the payment function activation request can be generated, and the above steps S203 and S204 can be executed to activate the payment function for convenience of subsequent callings.

Figure 5:
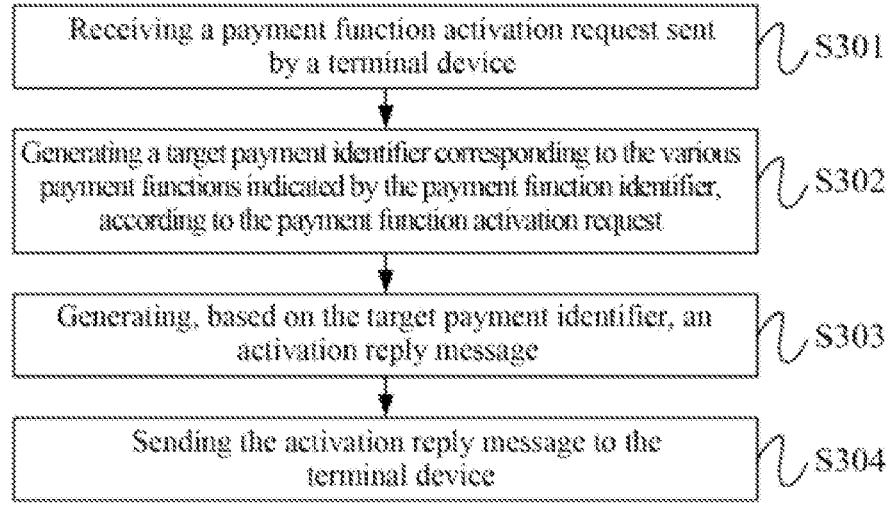
FIG. 5 is a flowchart of an embodiment of the method for activating payment functions provided by the second aspect of the present application.

The second aspect of the present application also provides a method for activating payment functions, and the method for activating payment functions is applicable to a server. FIG. 5 is a flowchart of an embodiment of the method for activating payment functions provided by the second aspect of the present application. As shown in FIG. 5, the method for activating payment functions can include steps S301-S304.

In step S301, a payment function activation request sent by a terminal device is received.

The payment function activation request can include payment function identifier(s). The payment function identifier(s) can be used to indicate various payment functions that are instructed to be activated for a target resource card. That is, the payment function identifier(s) can be used to indicate the various payment functions that are instructed to be activated for the target resource card.

Specific contents of the payment function activation request, payment function identifier(s), payment function(s), etc. can refer to relevant descriptions in the above embodiments, which will not be repeated here.

In step S302, a target payment identifier corresponding to the various payment functions indicated by the payment function identifiers is generated according to the payment function activation request.

The target payment identifier can include payment identifiers of the target resource card under the various payment functions that are instructed to be activated for the target resource card. That is, the target payment identifier can include the payment identifiers of the target resource card under the various payment functions that are instructed to be activated for the target resource card. Specifically, the server can store a corresponding relationship between payment function identifier(s) and payment function(s), and can determine the various payment functions corresponding to the payment function identifier(s) from the corresponding relationship according to the payment function identifier(s) in the payment function activation request, that is, the various payment functions indicated by the payment function identifier(s). One payment identifier can be generated correspondingly for the target resource card under each payment function.

In step S303, an activation reply message is generated based on the target payment identifier.

The activation reply message can be used to reply the payment function activation request of the terminal device. The activation reply message can include the target payment identifier.

In step S304, the activation reply message is sent to the terminal device.

The activation reply message can be sent to the terminal device, so that the terminal device can obtain the target payment identifier, and can use the target payment identifier to pay under the corresponding payment function.

In the embodiments of the present application, the server can receive the payment function activation request sent by the terminal device, and the payment function activation request can include the payment function identifier(s) for indicating the various payment functions that are instructed to be activated for the target resource card. The target payment identifier(s) corresponding to the various payment functions indicated by the payment function identifier(s) can be generated according to the payment function activation request, and the target payment identifiers can be sent to the terminal device, so that the terminal device can use the target payment identifier(s) to pay in a paying process. According to the payment function identifier(s), the server can activate the various payment functions that are instructed to be activated for the target resource card at the same time, and there is no need to activate the various payment functions one by one. Therefore, user operations for activating payment functions can be reduced, and the process for activating payment functions can be simplified. The various payment functions that are supported to be activated for the target resource card can be activated at one time, and the payment identifier(s) corresponding to the various activated payment functions can be sent to the terminal device, so that the terminal device can use corresponding payment identifier(s) for payment under different payment functions.

In some examples, under a condition that the terminal device includes a near field communication module and a near field communication payment function and a QR code payment function have not been activated for the target resource card, the payment function identifier may be used to indicate the near field communication payment function and the QR code payment function, and the target payment identifier may include a payment identifier of the target resource card under the near field communication payment function and a payment identifier of the target resource card under the QR code payment function.

In some other examples, under a condition that the terminal device includes the near field communication module, and the near field communication payment function has been activated for the target resource card and the QR code payment function has not been activated for the target resource card, the payment function identifier may indicate the QR code payment function, and the target payment identifier may include the payment identifier of the target resource card under the QR code payment function.

In some yet other examples, under a condition that the terminal device includes the near field communication module and the QR payment function has been activated for the target resource card and the near field communication payment function has not been activated for the target resource card, the payment function identifier may indicate the near field communication payment function, and the target payment identifier may include the payment identifier of the target resource card under the near field communication payment function.

In some yet other examples, under a condition that the terminal device does not include the near field communication module, and the QR code payment function has not been activated for the target resource card, the payment function identifier may indicate the QR code payment function, and the target payment identifier may include the payment identifier of the target resource card under the QR code payment function.

Specific contents of the above various payment functions of the target resource card, including the near field communication payment function and the QR code payment function can refer to relevant descriptions in the above embodiments, which will not be repeated here.

Figure 6:
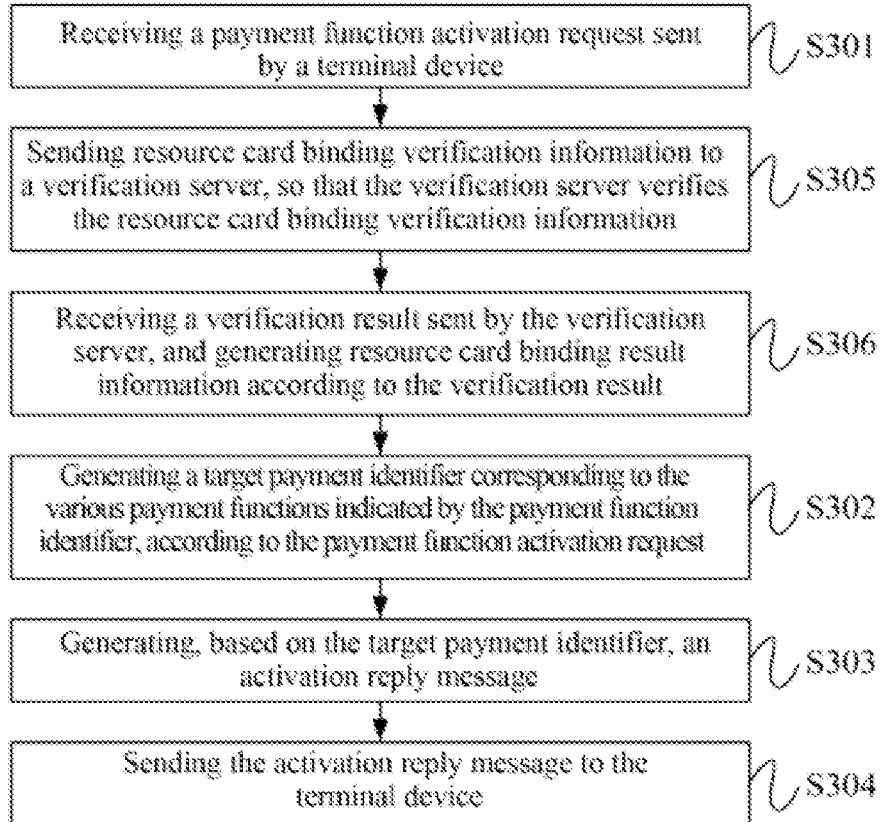
FIG. 6 is a flowchart of another embodiment of the method for activating payment functions provided by the second aspect of the present application.

In some examples, a binding of a resource card can be performed in the same process of activating payment functions. The payment function activation request in the above embodiment can further include resource card binding verification information, and the activation reply message can further include resource card binding result information. FIG. 6 is a flowchart of another embodiment of the method for activating payment functions provided by the second aspect of the present application. FIG. 6 is different from FIG. 5 in that the method for activating payment functions shown in FIG. 6 can further include steps S305 and S306.

In step S305, the resource card binding verification information is sent to a verification server, so that the verification server can verify the resource card binding verification information.

The payment function activation request received by the server can further include the resource card binding verification information, the resource card binding verification information can be sent to the verification server by the server, and can be verified by the verification server.

The resource card binding verification information can be used to verify a binding of the target resource card to a user's account, that is, the resource card binding verification information is the card information required for the resource card binding verification, which can be set according to scenarios and the requirements, and is not limited herein. For example, the resource card binding verification information can include one or more of a card number of the resource card, a user's phone number, a password of the resource card, a card verification value (CVV), etc., which is not limited herein.

In step S306, a verification result sent by the verification server is received, and the resource card binding result information is generated according to the verification result.

The verification result can include a successful verification or an unsuccessful verification. The resource card binding result information can include successful binding information or unsuccessful binding information. When the verification result includes the successful verification success, the resource card binding result information includes the successful binding information correspondingly. When the verification result includes the unsuccessful verification, the resource card binding result information includes the unsuccessful binding information correspondingly.

The activation reply message can further include the resource card binding result information, so that the resource card binding result information is passed to the terminal device through the activation reply message. It should be noted that, when the resource card binding result information includes the unsuccessful binding information, the server will not generate a payment identifier corresponding to a payment function that is instructed to be activated for the terminal device. When resource card binding result information includes the successful binding information, the server will generate a payment identifier corresponding to a payment function that is instructed to be activated for the terminal device.

The payment function activation request can be generated according to both the resource card binding verification information and the payment function identifier(s), so that the payment function activation request can request to bind the resource card and activate payment function(s) at the same time. As such, the binding of the resource card can be combined with the activating of payment function(s), and it is not necessary to activate the payment function(s) after the resource card has been bound. Therefore, the payment function(s) can be activated at the same time as the process for binding the resource card, which reduces user operations and simplifies the process for binding the resource card and activating the payment function(s) for it.

Figure 7:
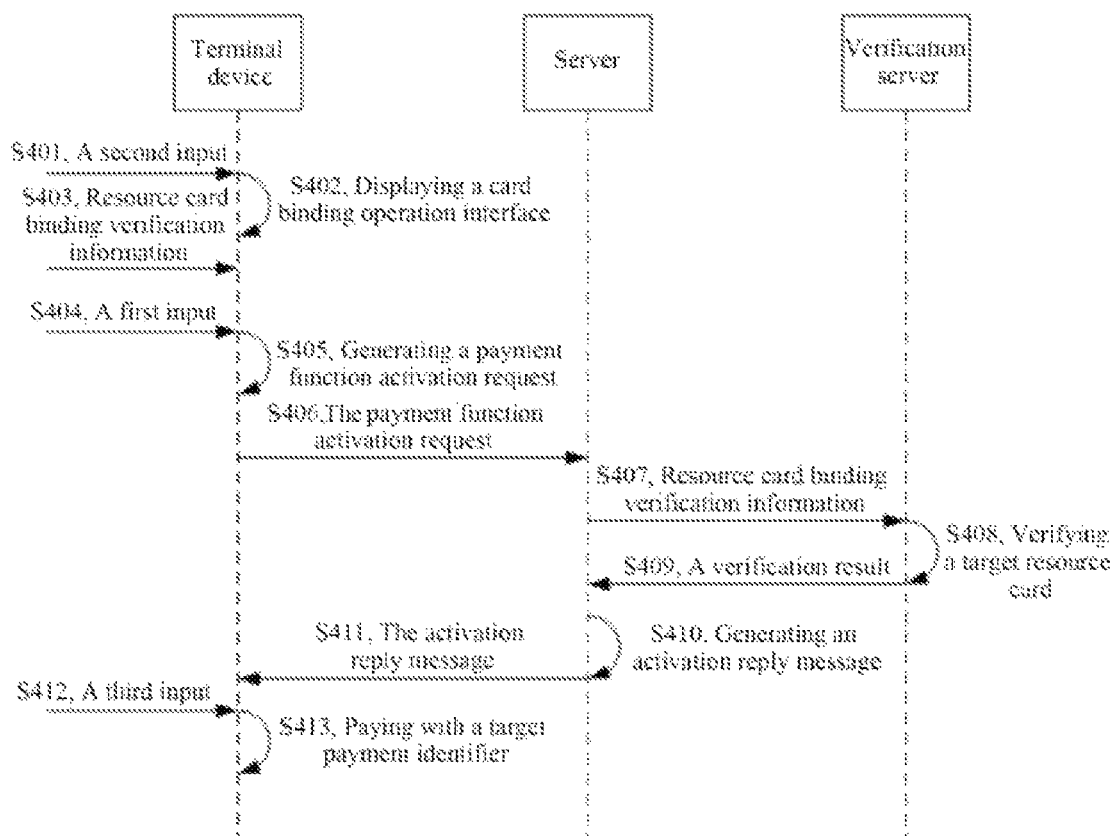
FIG. 7 is a schematic diagram of an example of a process for implementing resource card binding and payment function activating jointly provided by an embodiment of the present application.

An example in which resource card binding and payment function activating can be completed at one time, and the payment functions that are instructed to be activated for the target resource card include the near field communication payment function and the QR code payment function is illustrated below for description of interactions among a terminal device, a server and a verification server. FIG. 7 is a schematic diagram of an example of a process for implementing resource card binding and payment function activating jointly provided by an embodiment of the present application. As shown in FIG. 7, the process for implementing resource card binding and payment function activating jointly can include steps S401-S413.

In step S401, a second input from a user is received.

In step S402, a terminal device is aroused to display a card binding operation interface in response to the second input, to prompt the user to enter resource card binding verification information of the target resource card.

In step S403, the resource card binding verification information entered by the user is received.

In step S404, a first input from the user is received.

In step S405, a payment function activation request is generated in response to the first input.

The payment function activation request can include payment function identifier(s) and the resource card binding verification information. The payment function identifier(s) can be used to indicate the near field communication payment function and the QR code payment function.

In step S406, the payment function activation request is sent to the server.

In step S407, the server sends the resource card binding verification information to the verification server.

In step S408, the verification server verifies the target resource card according to the resource card binding verification information.

In step S409, the server receives a verification result sent by the verification server.

In step S410, the server binds the target resource card according to the verification result, and generates an activation reply message according to the payment function identifier(s).

The activation reply message can include target payment identifier(s). The target payment identifier(s) can include a payment identifier of the successfully bound target resource card under each of various activated payment functions. In this example, the activation reply message can includes a payment identifier of the successfully bound target resource card under the activated near field communication payment function and a payment identifier of the successfully bound target resource card under the activated QR code payment function.

In step S411, the server sends the activation reply message to the terminal device.

In step S412, the terminal device receives a third input.

In step S413, the terminal device arouses the terminal device to display a payment interface in response to the third input, and pays with the target payment identifier(s).

The payment interface can include the near field communication payment function and the QR code payment function.

In the above process, a payment function identifier can indicate one payment function or other types of payment functions, and a process for activating the payment function or the other types of payment functions can refer to the above process, which is not repeated here.

Figure 8:
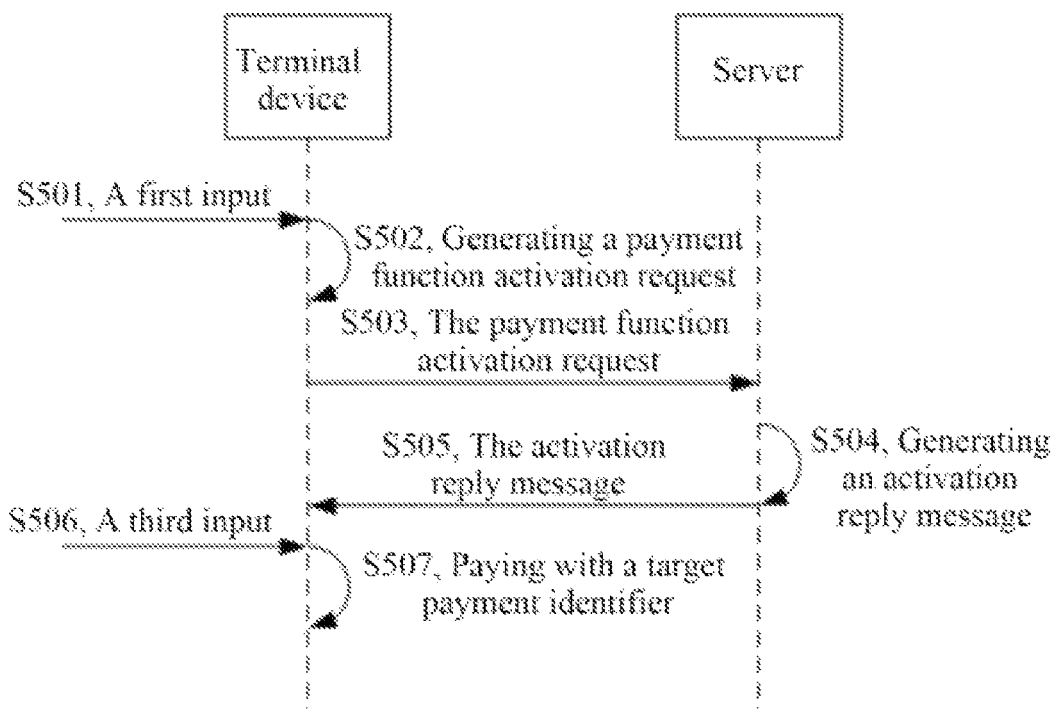
FIG. 8 is a schematic diagram of an example of a process for activating payment functions provided by an embodiment of the present application.

An example in which the resource card has already been pre-bound (i.e., bound in advance), payment function(s) are to be activated for the pre-bound resource card, and payment function(s) that are supported by the terminal device to activate for the pre-bound resource card include the QR code payment function is illustrated below for description of interactions among a terminal device, a server and a verification server. FIG. 8 is a schematic diagram of an example of a process for activating payment functions provided by an embodiment of the present application. As shown in FIG. 8, the process for activating payment functions can include steps S501-S507.

In step S501, a first input from a user is received.

In step S502, a payment function activation request is generated in response to the first input.

The payment function activation request can include payment function identifier(s). The payment function identifier(s) can be used to indicate the QR code payment function.

In step S503, the payment function activation request is sent to the server.

In step S504, the server generates an activation reply message according to the payment function identifier(s).

The activation reply message can include the target payment identifier of the target resource card under the activated QR code payment function.

In step S505, the server sends the activation reply message to the terminal device.

In step S506, the terminal device receives a third input.

In step S507, the terminal device arouses the terminal device to display a payment interface in response to the third input, and pays with the target payment identifier.

In the above process, the payment function identifier(s) can indicate other types of payment functions or more payment functions, and the other types of payment functions or more payment functions can refer to the above process, which is not repeated here.

Figure 9:
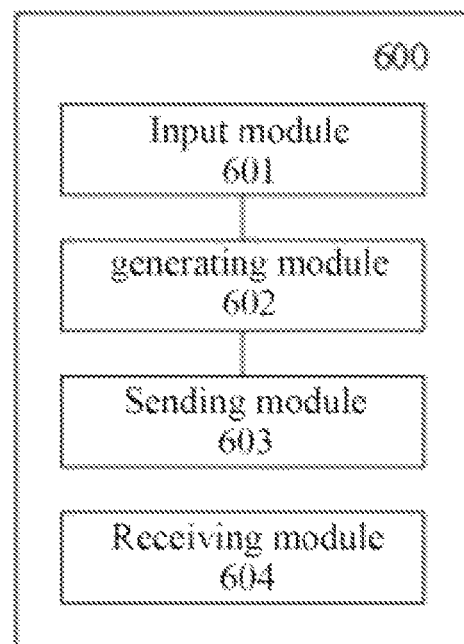
FIG. 9 is a schematic structure diagram of an embodiment of the terminal device provided by the third aspect of the present application.

The third aspect of the present application provides a terminal device. FIG. 9 is a schematic structure diagram of an embodiment of the terminal device provided by the third aspect of the present application. As shown in FIG. 9, the terminal device 600 can include an input module 601, a generating module 602, a sending module 603 and a receiving module 604.

The input module 601 can be configured to receive a first input from the user.

The generating module 602 can be configured to generate a payment function activation request in response to the first input.

The payment function activation request can include payment function identifier(s). The payment function identifier(s) can be used to indicate various payment functions that that are instructed to be activated for a target resource card.

The sending module 603 can be configured to send the payment function activation request to a server.

The receiving module 604 can be configured to receive an activation reply message sent by the server.

The activation reply message can include target payment identifier(s) generated by the server according to the payment function identifier(s). The target payment identifier(s) can include payment identifier(s) of the target resource card under the various payment functions that are instructed to be activated for the target resource card.

In the embodiment of the present application, the terminal device generates, in response to the first input from the user, the payment function activation request including the payment function identifier(s) for indicating the various payment functions that are instructed to be activated for the target resource card, and sends the payment function activation request to the server, so that the server activates the payment functions according to the payment function identifier(s) in the payment function activation request and sends the target payment identifier(s) corresponding to the various activated payment functions to the terminal device through the activation reply message. The terminal device receives the activation reply message, and can use the target payment identifier(s) corresponding to the activated payment functions to pay in a subsequent process. The server can activate, according to the payment function identifier(s), the various payment functions that are supported to be activated for the target resource card at one time, and there is thus no need to activate the various payment functions one by one. Therefore, user operations for activating the payment functions can be reduced, and the process for activating the payment functions can also be simplified.

The various payment functions that are instructed to be activated for the target resource card can be activated at one time, and the payment identifier(s) corresponding to the various activated payment functions can be sent to the terminal device, so that the terminal device can use corresponding payment identifier(s) for payment under different payment functions.

In some examples, the above generating module 602 can be configured to call payment function(s) of the target resource card in response to the first input; and generate the payment function activation request under a condition that it is determined that there is no payment function activated for the target resource card and the calling fails.

In some examples, the above generating module 602 can be configured to obtain hardware information of the terminal device and payment function activation status of the target resource card in response to the first input; determine various payment functions that are supported by the terminal device to activate for the target resource card, according to the hardware information of the terminal device and the payment function activation status of the target resource card; determine the various payment functions that are instructed to be activated for the target resource card, based on the various payment functions that are supported by the terminal device to activate for the target resource card; generate the payment function identifier(s) according to the various payment functions that are instructed to be activated for the target resource card; and generate the payment function activation request according to the payment function identifier(s).

Specifically, the above generating module 602 can be configured to send a prompt message including the various payment functions that are supported by the terminal device to activate for the target resource card, based on the various payment functions that are supported by the terminal device to activate for the target resource card.

The above receiving module 604 can further be configured to receive, from the user, a select input for instructing the various payment functions comprised in the prompt message.

The above generating module 602 can further be configured to determine the various payment functions indicated by the select input as the various payment functions that are instructed to be activated for the target resource card.

In some examples, under a condition that the hardware information indicates that the terminal device includes a near field communication module and the near field communication payment function and the QR code payment function have not been activated for the target resource card, the payment function identifier(s) may indicate the near field communication payment function and the QR code payment function, and the target payment identifier(s) may include a payment identifier of the target resource card under the near field communication payment function and a payment identifier of the target resource card under the QR code payment function.

In some other examples, under a condition that the hardware information indicates that the terminal device includes the near field communication module, and the near field communication payment function has been activated for the target resource card and the QR code payment function has not been activated for the target resource card, the payment function identifier may indicate the QR code payment function, and the target payment identifier may include the payment identifier of the target resource card under the QR code payment function.

In some yet other examples, under a condition that the hardware information indicates that the terminal device includes the near field communication module, and the QR payment function has been activated for the target resource card but the near field communication payment function has not been activated for the target resource card, the payment function identifier may indicate the near field communication payment function, and the target payment identifier may include the payment identifier of the target resource card under the near field communication payment function.

In some yet other examples, under a condition that the hardware information indicates that the terminal device does not include the near field communication module, and the QR code payment function has not been activated for the target resource card, the payment function identifier may indicate the QR code payment function, and the target payment identifier may include the payment identifier of the target resource card under the QR code payment function.

Figure 10:
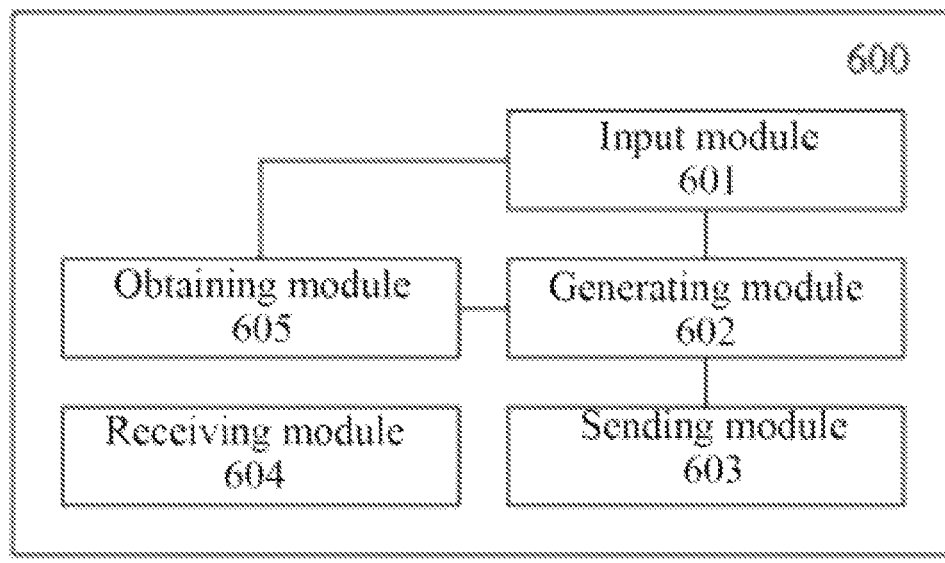
FIG. 10 is a schematic structure diagram of another embodiment of the terminal device provided by the third aspect of the present application.

FIG. 10 is a schematic structure diagram of another embodiment of the terminal device provided by the third aspect of the present application. FIG. 10 differs from FIG. 9 in that the terminal device 600 can further include an obtaining module 605.

The input module 601 in the above embodiment can further be configured to receive a second input from the user.

The obtaining module 605 can be configured to be aroused to obtain the resource card binding verification information of the target resource card in response to the second input.

The payment function activation request can further include the resource card binding verification information. The resource card binding verification information can be used to verify a binding of the target resource card to a user's account. The activation reply message can further include the resource card binding result information. The resource card binding result information can include successful binding information or unsuccessful binding information.

In some examples, the second input can be a first preset input operation performed by the user on a first preset component of the terminal device.

Figure 11:
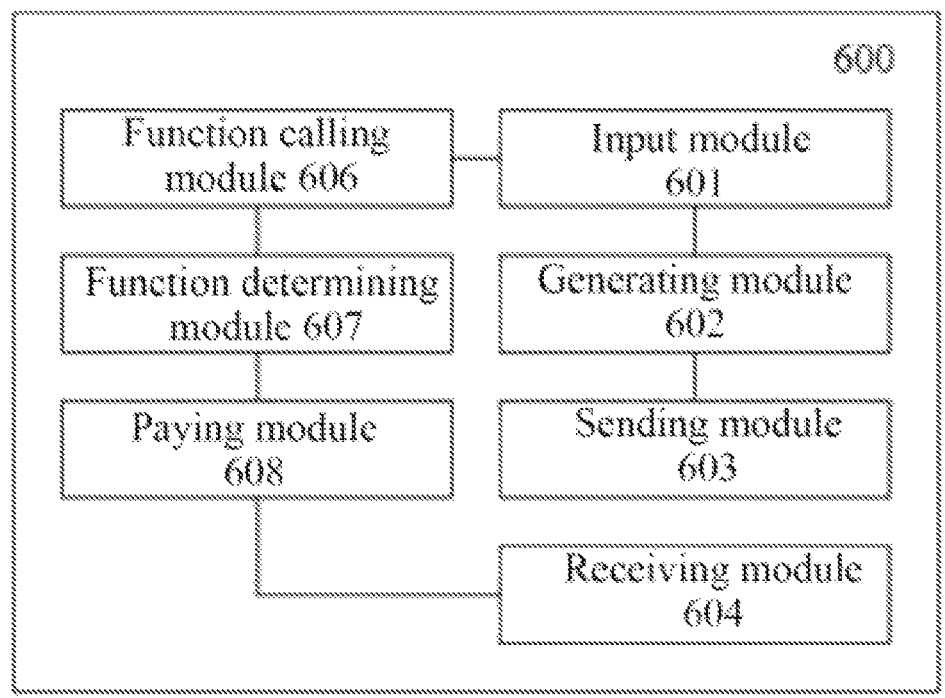
FIG. 11 is a schematic structure diagram of yet another embodiment of the terminal device provided by the third aspect of the present application.

FIG. 11 is a schematic structure diagram of yet another embodiment of the terminal device provided by the third aspect of the present application. FIG. 11 differs from FIG. 9 in that the terminal device 600 can further include a function calling module 606, a function determining module 607 and a paying module 608.

The input module 601 in the above embodiment can further be configured to receive a third input from the user.

The function calling module 606 can be configured to call various activated payment functions synchronously, in response to the third input.

The function determining module 607 can be configured to determine a target payment function corresponding to received payment information, according to the received payment information.

The paying module 608 can be configured to pay with a payment identifier of the target resource card under the target payment function.

In some examples, the third input may be a second preset input operation performed by the user on a second preset component of the terminal device.

The input module 601 in the above embodiment can be implemented by a touch panel, a display panel, a keyboard, a camera, a microphone, a mechanical button, etc., which is not limited herein.

The above generating module 602, obtaining module 605, function calling module 606, function determining module 607, and payment module 608 can be implemented by a processor in the terminal device. The processor can include one or more processing units. In some examples, the processor can integrate an application processor and a modem processor. The application processor can mainly process an operating system, a user interface, an application program, and the like. The modem processor can mainly process wireless communications.

The sending module 603 and the receiving module 604 can be implemented by a radio frequency unit in the terminal device. The radio frequency unit can communicate data with a base station, and can communicate with a network and another device through a wireless communication system, which is not limited herein. The radio frequency unit can include but is not limited to an antenna, an amplifier, a transceiver, a coupler, a low noise amplifier, a duplexer, a Bluetooth module, a wireless communication network module, and the like.

Figure 12:
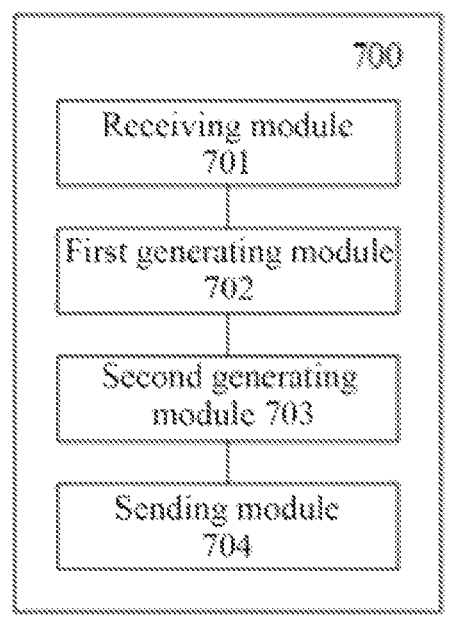
FIG. 12 is a schematic structure diagram of an embodiment of the server provided by the fourth aspect of the present application.

The fourth aspect of the present application provides a server. FIG. 12 is a schematic structure diagram of an embodiment of the server provided by the fourth aspect of the present application. As shown in FIG. 12, the server 700 can include a receiving module 701, a first generating module 702, a second generating module 703 and a sending module 704.

The receiving module 701 can be configured to receive a payment function activation request sent by a terminal device.

The payment function activation request can include payment function identifier(s). The payment function identifier(s) can be used to indicate various payment functions that are instructed to be activated for target resource card.

The first generating module 702 can be configured to generate target payment identifier(s) corresponding to various payment functions indicated by the payment function identifier(s), according to the payment function activation request.

The target payment identifier(s) can include payment identifiers of the target resource card under the various payment functions that are instructed to be activated for the target resource card.

The second generating module 703 can be configured to generate an activation reply message based on the target payment identifier(s).

The activation reply message can include the target payment identifier(s).

The sending module 704 can be configured to send the activation reply message to the terminal device.

In the embodiment of the present application, the server can receive the payment function activation request sent by the terminal device, and the payment function activation request can include the payment function identifier(s) for indicating the various payment functions that are instructed to be activated for the target resource card. The target payment identifier(s) corresponding to the various payment functions indicated by the payment function identifier(s) can be generated according to the payment function activation request, and the target payment identifiers can be sent to the terminal device, so that the terminal device can use the target payment identifier(s) to pay in a paying process. According to the payment function identifier(s), the server can activate the various payment functions that are instructed to be activated for the target resource card at the same time, and there is no need to activate the various payment functions one by one. Therefore, user operations for activating payment functions can be reduced, and the process for activating payment functions can be simplified. The various payment functions that are supported to be activated for the target resource card can be activated at one time, and the payment identifier(s) corresponding to the various activated payment functions can be sent to the terminal device, so that the terminal device can use corresponding payment identifier(s) for payment under different payment functions.

In some examples, under a condition that the terminal device includes a near field communication module and a near field communication payment function and a QR code payment function have not been activated for the target resource card, the payment function identifier may be used to indicate the near field communication payment function and the QR code payment function, and the target payment identifier may include a payment identifier of the target resource card under the near field communication payment function and a payment identifier of the target resource card under the QR code payment function.

In some other examples, under a condition that the terminal device includes the near field communication module, and the near field communication payment function has been activated for the target resource card and the QR code payment function has not been activated for the target resource card, the payment function identifier may indicate the QR code payment function, and the target payment identifier may include the payment identifier of the target resource card under the QR code payment function.

In some yet other examples, under a condition that the terminal device includes the near field communication module and the QR payment function has been activated for the target resource card and the near field communication payment function has not been activated for the target resource card, the payment function identifier may indicate the near field communication payment function, and the target payment identifier may include the payment identifier of the target resource card under the near field communication payment function.

In some yet other examples, under a condition that the terminal device does not include the near field communication module, and the QR code payment function has not been activated for the target resource card, the payment function identifier may indicate the QR code payment function, and the target payment identifier may include the payment identifier of the target resource card under the QR code payment function.

In some examples, the above sending module 704 can be further configured to send resource card binding verification information to a verification server, so that the verification server can verify the resource card binding verification information.

The above receiving module 701 can be further configured to receive a verification result sent by the verification server, and generate resource card binding result information according to the verification result.

The above first generating module 702 and second generating module 703 can be implemented by a processor in the server. The processor can include one or more processing units. In some examples, the processor can integrate an application processor and the modem processor. The application processor can mainly process an operating system, a user interface, an application program, and the like. The modem processor can mainly process wireless communications.

The receiving module 701 and sending module 704 can be implemented by a radio frequency unit in the server. The radio frequency unit can communicate the data with a base station, and can communicate with a network and another device through a wireless communication system, which is not limited herein. The radio frequency unit can include but is not limited to an antenna, an amplifier, a transceiver, a coupler, a low noise amplifier, a duplexer, a Bluetooth module, a wireless communication network module, and the like.

Figure 13:
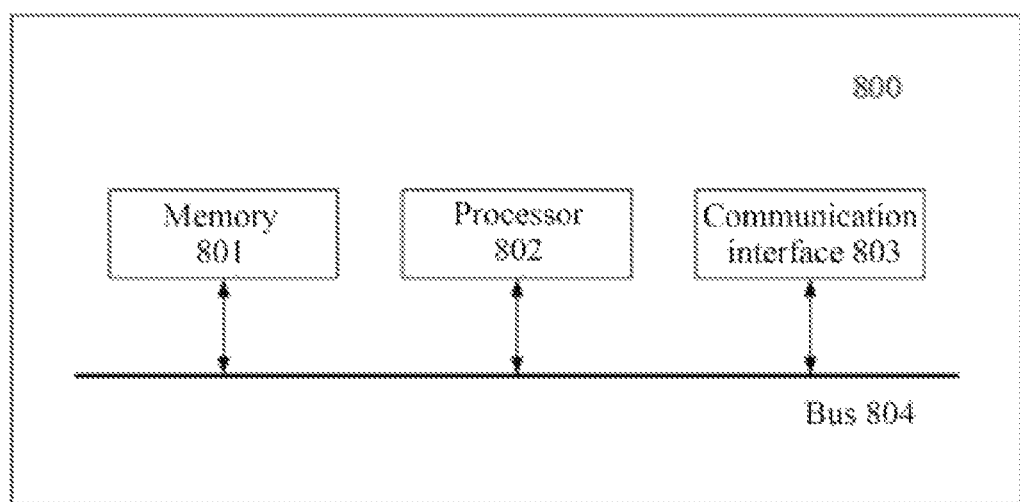
FIG. 13 is a schematic structure diagram of an embodiment of the terminal device provided by the fifth aspect of the present application.

The fifth aspect of the present application provides a terminal device. FIG. 13 is a schematic structure diagram of an embodiment of the terminal device provided by the fifth aspect of the present application. As shown in FIG. 13, the terminal device 800 includes a memory 801, a processor 802, and a computer program that is stored on the memory 801 and can be executed on the processor 802.

In one example, the above processor 802 can include a central processing unit (CPU), or an Application Specific Integrated Circuit (ASIC), or one or more integrated circuits that can be configured to implement the embodiments of the present application.

The memory 801 can include a Read-Only Memory (ROM), a Random Access Memory (RAM), a magnetic disk storage media device, an optical storage media device, a flash memory device, an electrical, optical or other physical/tangible memory storage device. Thus, typically, the memory can include one or more tangible (non-transitory) computer-readable storage media (such as memory devices) encoded with software including computer-executable instructions, and when the software is executed (such as by one or more processors), the software is operable to perform operations described with reference to the method for activating payment functions that is applied to the terminal device according to the embodiments of the present application.

The processor 802 can run a computer program corresponding to executable program codes stored in the memory 801 by reading the executable program codes, so as to implement the method for activating payment functions applied to the terminal device in the above embodiments.

In one example, the terminal device 800 can further include a communication interface 803 and a bus 804. As shown in FIG. 13, the memory 801, the processor 802, and the communication interface 803 are connected through the bus 804 and communicate with each other.

The communication interface 803 can be configured mainly to implement communications between modules, apparatuses, units and/or devices in the embodiments of the present application. An input device and/or an output device can also be connected through the communication interface 803.

The bus 804 can include hardware, software, or both, and couple components of the terminal device 800 to each other. As an example, rather than limitation, the bus 804 can include an Accelerated Graphics Port (AGP) or other graphics bus, an Enhanced Industry Standard Architecture (EISA) bus, a Front Side Bus (FSB), a HyperTransport (HT) interconnect, an Industrial Standard Architecture (ISA) bus, a wireless band interconnect, a Low pin count (LPC) bus, a memory bus, a MicroChannel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable bus or a combination of two or more of these. When appropriate, the bus 804 can include one or more buses. Although the embodiment of the present application describes and illustrates a particular bus, any suitable bus or interconnect should be considered in the present application.

Figure 14:
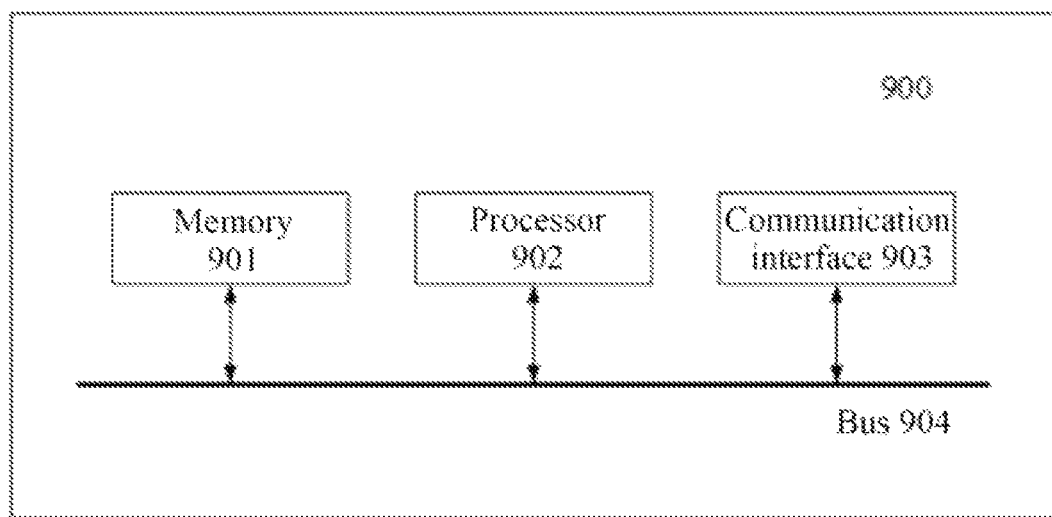
FIG. 14 is a schematic structure diagram of an embodiment of the server provided by the sixth aspect of the present application.

The sixth aspect of the present application provides a server. FIG. 14 is a schematic structure diagram of an embodiment of the server provided by the sixth aspect of the present application. As shown in FIG. 14, the server 900 includes a memory 901, a processor 902, and a computer program that is stored on the memory 901 and can be executed on the processor 902.

In one example, the above processor 902 can include a central processing unit (CPU), or an Application Specific Integrated Circuit (ASIC, or one or more integrated circuits that can be configured to implement the embodiments of the present application.

The memory 901 can include a Read-Only Memory (ROM), a Random Access Memory (RAM), a magnetic disk storage media device, an optical storage media device, a flash memory device, an electrical, optical or other physical/tangible memory storage device. Thus, typically, the memory can include one or more tangible (non-transitory) computer-readable storage media (such as memory devices) encoded with software including computer-executable instructions, and when the software is executed (such as by one or more processors), the software is operable to perform operations described with reference to the method for activating payment functions that is applied to the server according to the embodiments of the present application.

The processor 902 can run a computer program corresponding to executable program codes stored in the memory 901 by reading the executable program codes, so as to implement the method for activating payment functions applied to the server in the above embodiment.

In one example, the server 900 can further include the communication interface 903 and the bus 904. As shown in FIG. 14, the memory 901, the processor 902, and the communication interface 903 are connected through the bus 904 and communicate with each other.

The communication interface 903 can be configured mainly to implement communications between modules, apparatuses, units and/or devices in the embodiments of the present application. An input device and/or an output device can also be connected through the communication interface 903.

The bus 904 can include hardware, software, or both, and couple components of the server 900 to each other. As an example, rather than limitation, the bus 904 can include an Accelerated Graphics Port (AGP) or other graphics bus, an Enhanced Industry Standard Architecture (EISA) bus, a Front Side Bus (FSB), a HyperTransport (HT) interconnect, an Industrial Standard Architecture (ISA) bus, a wireless band interconnect, a Low pin count (LPC) bus, a memory bus, a MicroChannel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable bus or a combination of two or more of these. When appropriate, the bus 904 can include one or more buses. Although the embodiment of the present application describes and illustrates a particular bus, any suitable bus or interconnect should be considered in the present application.

The seventh aspect of the present application provides a system for activating payment functions, which can include the terminal device and the server in the above embodiments. Specific contents of the terminal device and the server can refer to relevant descriptions in the above embodiments, which will not be repeated here.

The eighth aspect of the present application provides a computer-readable storage medium, having a computer program stored thereon. The computer program, when executed by a processor, can implement the methods for activating payment functions in the above embodiments, and can achieve the same technological effects, which will not be repeated here to avoid redundancy. The above computer-readable storage medium can include a non-transitory computer-readable storage medium, such as a Read-Only Memory (ROM), a Random Access Memory (RAM), a magnetic disk or an optical disk etc., which is not limited herein.

It should be noted that, the various embodiments in the specification are described in a progressive way, and the same or similar parts of these embodiments may be referred to each other. Each embodiment focuses on the differences from other embodiments. For the embodiments of the terminal device, the server, the system and the computer-readable storage medium, related parts can refer to the description part of the method embodiments. The application is not limited to the specific steps and structures described above and shown in the figures. Those skilled in the art can make various changes, modifications and additions, or change the order between steps after understanding the gist of the present application. And, for the sake of brevity, a detailed description of known methods and technologies is omitted here.

Aspects of the present application are described above with reference to flowcharts and/or block diagrams of the methods, apparatuses (systems) and computer program products according to the embodiments of the present application. It should be understood that each block of the flowcharts and/or the block diagrams, and a combination of respective blocks of the flowcharts and/or the block diagrams can be implemented by computer program instructions. These computer program instructions can be provided to a processor of a general purpose computer, special purpose computer, or other programmable data processing apparatus, to produce a machine, such that execution of the instructions by the processor of the computer or other programmable data processing apparatus enables the implementation of the functions/actions specified in one or more blocks of the flowcharts and/or the block diagrams. Such processor can be but is not limited to a general purpose processor, a special purpose processor, an application specific processor, or a field programmable logic circuit. It should also be understood that each block of the block diagrams and/or the flowcharts, and a combination of blocks of the block diagrams and/or the flowcharts can also be implemented by special purpose hardware for performing specified functions or actions, or by a combination of the special purpose hardware and a computer instruction.

Those skilled in the art should understand that the above embodiments are all illustrative and not restrictive. Different technical features appearing in different embodiments can be combined to achieve beneficial effects. Those skilled in the art should be able to understand and implement other modified embodiments of the disclosed embodiments, on the basis of studying the drawings, the description, and the claims. In the claims, the term "comprising" does not exclude other apparatuses or steps; the numeral word "one" does not exclude more than one; the terms "first" and "second" are used to indicate names and not to indicate any particular order. Any reference signs in the claims should not be construed as limiting the protection scope. The functions of several parts appearing in the claims can be implemented by a single hardware or software module. The presence of certain technical features in different dependent claims does not mean that these technical features cannot be combined to obtain beneficial effects.

What is claimed is:

1. A method for activating mobile payment functions, applicable to a terminal device, the method comprising:
arousing the terminal device to obtain resource card binding verification information of a target resource card from a user in response to a first input from the user in a case where a screen of the terminal device is turned off or locked during sleeping of the terminal device;

generating a payment function activation request in response to a second input from the user, the payment function activation request comprising a payment function identifier for indicating a plurality of mobile payment functions among available mobile payment functions of the target resource card that are activatable by the terminal device but have not been activated for the target resource card and comprising the resource card binding verification information for verifying a binding of the target resource card to an account of the user;

sending, to a server, the payment function activation request to instruct the server to activate the plurality of mobile payment functions indicated by the payment function identifier; and receiving an activation reply message sent by the server, the activation reply message comprising a target payment identifier generated by the server according to the payment function identifier, the target payment identifier comprising a plurality of payment identifiers of the target resource card under the plurality of mobile payment functions, and each of the plurality of payment identifiers being an identifier required for payment using a corresponding one of the plurality of mobile payment functions, and the activation reply message further comprising resource card binding result information which is successful binding information or unsuccessful binding information, calling synchronously a plurality of activated mobile payment functions of the target resource card, wherein the plurality of activated mobile payment functions respectively corresponding to the plurality of payment identifiers indicated in the activation reply messaae, in response to a third input from the user;

determining a target payment function corresponding to received payment information from the plurality of activated mobile payment functions, according to the received payment information; and paying with a payment identifier of the target resource card under the target payment function.

2. The method according to claim 1, wherein generating the payment function activation request in response to the first input comprises:

calling a payment function among the available mobile payment functions of the target resource card in response to the first input; and generating the payment function activation request, under a condition that it is determined that the payment function has not been activated for the target resource card and the calling fails.

3. The method according to claim 1, wherein generating the payment function activation request comprises:

obtaining hardware information of the terminal device and payment function activation status of the target resource card;

determining mobile payment functions among the available mobile payment functions that are activatable by the terminal device but have not been activated for the target resource card, according to the hardware information of the terminal device and the payment function activation status of the target resource card;

determining the plurality of mobile payment functions, based on the determined payment functions;

generating the payment function identifier according to the plurality of mobile payment functions; and generating the payment function activation request according to the payment function identifier.

4. The method according to claim 3, wherein determining the plurality of mobile payment functions based on the determined mobile payment functions comprises:

sending a prompt message comprising the determined mobile payment functions, based on the determined mobile payment functions;

receiving, from the user, a select input for indicating mobile payment functions from the determined mobile payment functions comprised in the prompt message; and determining the mobile payment functions indicated by the select input as the plurality of mobile payment functions.

5. The method according to claim 3, wherein under a condition that the hardware information indicates that the terminal device comprises a near field communication module and a near field communication payment function and a quick response (QR) code payment function have not been activated for the target resource card, the payment function identifier indicates the near field communication payment function and the QR code payment function, and the target payment identifier comprises a payment identifier of the target resource card under the near field communication payment function and a payment identifier of the target resource card under the QR code payment function;

under a condition that the hardware information indicates that the terminal device comprises the near field communication module and the near field communication payment function has been activated for the target resource card and the QR code payment function has not been activated for the target resource card, the payment function identifier indicates the QR code payment function, and the target payment identifier comprises a payment identifier of the target resource card under the QR code payment function;

under a condition that the hardware information indicates that the terminal device comprises the near field communication module and the OR payment function has been activated for the target resource card and the near field communication payment function has not been activated for the target resource card, the payment function identifier indicates the near field communication payment function, and the target payment identifier comprises a payment identifier of the target resource card under the near field communication payment function; or under a condition that the hardware information indicates that the terminal device does not comprise the near field communication module, and the QR code payment function has not been activated for the target resource card, the payment function identifier indicates the QR code payment function, and the target payment identifier comprises a payment identifier of the target resource card under the QR code payment function.

6. The method according to claim 1, wherein the second input is a first preset input operation performed by the user on a first preset component of the terminal device.

7. The method according to claim 1, wherein the third input is a second preset input operation performed by the user on a second preset component of the terminal device.

8. A method for activating mobile payment functions the method comprising:

arousing, by a terminal device, the terminal device to obtain resource card binding verification information of a target resource card from a user in response to a first input from the user in a case where a screen of the terminal device is turned off or locked during sleeping of the terminal device;

generating, by a terminal device, a payment function activation request in response to a second input from the user, the payment function activation request comprising a payment function identifier for indicating a plurality of mobile payment functions among available mobile payment functions of the target resource card that are activatable by the terminal device but have not been activated for the target resource card and comprising the resource card binding verification information for verifying a binding of the target resource card to an account of the user;

sending, by a terminal device to a server, the payment function activation request to instruct the server to activate the plurality of mobile payment functions indicated by the payment function identifier;

receiving, by the server, the payment function activation request sent by a terminal device;

generating, by the server, a target payment identifier corresponding to the plurality of mobile payment functions indicated by the payment function identifier according to the payment function activation request, the target payment identifier comprising payment identifiers of the target resource card under the plurality of mobile payment functions, and each of the payment identifiers being an identifier required for payment using a corresponding one of the plurality of mobile payment functions;

sending, by the server, the resource card binding verification information to a verification server, so that the verification server verifies the resource card binding verification information;

receiving, by the server, a verification result sent by the verification server;

generating, by the server, resource card binding result information according to the verification result;

generating, by the server, based on the target payment identifier and the resource card binding result information, activation reply message; and sending, by the server, the activation reply message to the terminal device, receiving, by the terminal device, the activation reply message sent by the server;

calling synchronously, by the terminal device, a plurality of activated mobile payment functions of the target resource card, wherein the plurality of activated mobile payment functions respectively corresponding to the plurality of payment identifiers indicated in the activation reply message, in response to a third input from the user;

determining, by the terminal device, a target payment function corresponding to received payment information from the plurality of activated mobile payment functions, according to the received payment information; and paying, by the terminal device, with a payment identifier of the target resource card under the target payment function.

9. The method according to claim 8, wherein under a condition that the terminal device comprises a near field communication module and a near field communication payment function and a quick response (QR) code payment function have not been activated for the target resource card, the payment function identifier is used to indicate the near field communication payment function and the QR code payment function, and the target payment identifier comprises a payment identifier of the target resource card under the near field communication payment function and a payment identifier of the target resource card under the QR code payment function;

under a condition that the terminal device comprises the near field communication module and the near field communication payment function has been activated for the target resource card and the QR code payment function has not been activated for the target resource card, the payment function identifier indicates the QR code payment function, and the target payment identifier comprises a payment identifier of the target resource card under the QR code payment function;

under a condition that the terminal device comprises the near field communication module and the OR payment function has been activated for the target resource card and the near field communication payment function has not been activated for the target resource card, the payment function identifier indicates the near field communication payment function, and the target payment identifier comprises a payment identifier of the target resource card under the near field communication payment function; or under a condition that the terminal device does not comprise the near field communication module and the QR code payment function has not been activated for the target resource card, the payment function identifier indicates the QR code payment function, and the target payment identifier comprises a payment identifier of the target resource card under the QR code payment function.

10. A terminal device, comprising:

a processor and a memory having computer program instructions stored thereon, wherein the computer program instructions, when executed by the processor, cause the activation of mobile payment functions by:

arousing the terminal device to obtain resource card binding verification information of a target resource card from a user in response to a first input from the user in a case where a screen of the terminal device is turned off or locked during sleeping of the terminal device;

generating a payment function activation request in response to a second input from the user, the payment function activation request comprising a payment function identifier for indicating a plurality of mobile payment functions among available mobile payment functions of the target resource card that are activatable by the terminal device but have not been activated for the target resource card, and comprising the resource card binding verification information for verifying a binding of the target resource card to an account of the user; sending, to a server, the payment function activation request to instruct the server to activate the plurality of mobile payment functions indicated by the payment function identifier; and receiving an activation reply message sent by the server, the activation reply message comprising a target payment identifier generated by the server according to the payment function identifier, the target payment identifier comprising a plurality of payment identifiers of the target resource card under the plurality of mobile payment functions, and each of the plurality of payment identifiers being an identifier required for payment using a corresponding one of the plurality of mobile payment functions, and the activation reply message further comprising resource card binding result information which is successful binding information or unsuccessful binding information;

calling synchronously a plurality of activated mobile payment functions of the target resource card, wherein the plurality of activated mobile payment functions respectively corresponding to the plurality of payment identifiers indicated in the activation reply message, in response to a third input from the user;

determining a target payment function corresponding to received payment information from the plurality of activated mobile payment functions, according to the received payment information; and paying with a payment identifier of the target resource card under the target payment function.

11. A system, comprising:

a terminal device; and a server, wherein the terminal device is configured to:

arouse the terminal device to obtain resource card binding verification information of the target resource card from a user in response to a first input from the user in a case where a screen of the terminal device is turned off or locked during sleeping of the terminal device;

generate a payment function activation request in response to a second input from the user, the payment function activation request comprising a payment function identifier for indicating a plurality of mobile payment functions among available mobile payment functions of the target resource card that are activatable by the terminal device but have not been activated for the target resource card and comprising the resource card binding verification information for verifying a binding of the target resource card to an account of the user;

send, to a server, the payment function activation request to instruct the server to activate the plurality of mobile payment functions indicated by the payment function identifier; and receive an activation reply message sent by the server, the activation reply message comprising a target payment identifier generated by the server according to the payment function identifier, the target payment identifier comprising a plurality of payment identifiers of the target resource card under the plurality of mobile payment functions, and each of the plurality of payment identifiers being an identifier required for payment using a corresponding one of the plurality of mobile payment functions, and the activation reply message further comprising resource card binding result information which is successful binding information or unsuccessful binding information, call synchronously a plurality of activated mobile payment functions of the target resource card, wherein the plurality of activated mobile payment functions respectively corresponding to the plurality of payment identifiers indicated in the activation reply message, in response to a third input from the user;

determine a target payment function corresponding to received payment information from the plurality of activated mobile payment functions, according to the received payment information; and pay with a payment identifier of the target resource card under the target payment function wherein the server is configured to:

receive the payment function activation request sent by a terminal device;

generate the target payment identifier corresponding to the plurality of mobile payment functions indicated by the payment function identifier, according to the payment function activation request;

send the resource card binding verification information to a verification server, so that the verification server verifies the resource card binding verification information;

receive a verification result sent by the verification server; and generate the resource card binding result information according to the verification result;

generate, based on the target payment identifier and the resource card binding result information, the activation reply message; and send the activation reply message to the terminal device.

12. The method according to claim 1, wherein the payment function identifier comprises a single one identifier which indicting the plurality of mobile payment functions, or the payment function identifier comprises a plurality of identifiers which correspond to the plurality of mobile payment functions one by one.

13. The method according to claim 1, wherein each of the payment identifiers is a token required for payment using a corresponding one of the plurality of mobile payment functions.

* * * * *